(12) United States Patent
Pickett et al.

(10) Patent No.: US 10,655,815 B2
(45) Date of Patent: May 19, 2020

(54) QUANTUM DOT-BASED LIGHTING DEVICES FOR ANIMAL HUSBANDRY AND AQUARIUMS

(71) Applicant: Nanoco Technologies Ltd., Manchester (GB)

(72) Inventors: Nigel Pickett, Manchester (GB); Nathalie Gresty, Manchester (GB)

(73) Assignee: Nanoco Technologies Ltd., Manchester (GB)

(*) Notice: Subject to any disclaimer, the term of this patent is extended or adjusted under 35 U.S.C. 154(b) by 0 days.

(21) Appl. No.: 15/411,653

(22) Filed: Jan. 20, 2017

(65) Prior Publication Data

US 2017/0211779 A1   Jul. 27, 2017

Related U.S. Application Data

(60) Provisional application No. 62/281,882, filed on Jan. 22, 2016.

(51) Int. Cl.
   *F21V 17/00*   (2006.01)
   *F21V 5/04*    (2006.01)
   (Continued)

(52) U.S. Cl.
   CPC ............. *F21V 5/04* (2013.01); *A01K 45/00* (2013.01); *A01K 63/06* (2013.01); *F21K 9/275* (2016.08);
   (Continued)

(58) Field of Classification Search
   CPC ..... F21V 5/04; F21V 9/16; F21V 9/08; F21V 17/002; F21V 9/02; F21V 3/02; F21V 31/005; F21V 9/30; F21K 9/275; A01K 63/06; A01K 45/00; F21Y 2115/10; F21Y 2113/13; F21W 2131/308
   See application file for complete search history.

(56) References Cited

U.S. PATENT DOCUMENTS 9,082,941 B2    7/2015  Naasani et al.
2004/0201980 A1* 10/2004 Fischer ............... A61B 5/0088
                                                    362/260
(Continued)

OTHER PUBLICATIONS

Baxter, M. et al.; "Red light is necessary to activate the reproductive axis in chickens independently of the retina of the eye"; Poultry Science; 2014; v. 93; pp. 1289-1297.
(Continued)

*Primary Examiner* — Y M. Lee
(74) *Attorney, Agent, or Firm* — Blank Rome, LLP

(57) ABSTRACT

A lighting fixture for promoting the development of animals comprises a backlight, such as an LED or an array of LEDs, and a series of one or more retractable, rotatable or interchangeable lenses comprising quantum dots, such that the color and/or color temperature of the light emitted by the lighting fixture can be altered and optimized during animal development. A lighting fixture adapted for use on an aquarium may be in the form factor of a standard fluorescent tube and comprise one or more LEDs and a quantum dot-containing film for down-converting at least a portion of the light emitted by the LEDs so as to provide optimum wavelengths for photosynthesis by aquarium plants while simultaneously providing attractive display lighting for the aquarium fish.

19 Claims, 3 Drawing Sheets

(51) Int. Cl.
| | |
|---|---|
| F21V 9/30 | (2018.01) |
| A01K 45/00 | (2006.01) |
| F21K 9/275 | (2016.01) |
| A01K 63/06 | (2006.01) |
| F21V 3/02 | (2006.01) |
| F21V 9/02 | (2018.01) |
| F21V 9/08 | (2018.01) |
| F21V 31/00 | (2006.01) |
| F21Y 113/13 | (2016.01) |
| F21Y 115/10 | (2016.01) |
| F21W 131/308 | (2006.01) |

(52) U.S. Cl.
CPC .................. *F21V 3/02* (2013.01); *F21V 9/02* (2013.01); *F21V 9/08* (2013.01); *F21V 9/30* (2018.02); *F21V 17/002* (2013.01); *F21V 31/005* (2013.01); *F21W 2131/308* (2013.01); *F21Y 2113/13* (2016.08); *F21Y 2115/10* (2016.08)

(56) References Cited

U.S. PATENT DOCUMENTS

| | | | |
|---|---|---|---|
| 2009/0034284 A1 | 2/2009 | Li et al. | |
| 2009/0141474 A1* | 6/2009 | Kolodin | F21V 3/04 362/84 |
| 2009/0268461 A1* | 10/2009 | Deak | F21K 9/61 362/247 |
| 2010/0259917 A1* | 10/2010 | Ramer | F21K 9/00 362/84 |
| 2011/0228515 A1* | 9/2011 | Grajcar | F21S 8/006 362/84 |
| 2013/0075692 A1 | 3/2013 | Naasani et al. | |
| 2013/0240920 A1* | 9/2013 | Lin | F21K 9/232 257/89 |
| 2014/0153264 A1* | 6/2014 | Wang | F21V 21/088 362/396 |
| 2014/0168992 A1* | 6/2014 | Xue | F21V 13/04 313/111 |
| 2014/0239336 A1* | 8/2014 | Streppel | F21V 5/045 257/98 |
| 2014/0264172 A1 | 9/2014 | Daniels et al. | |
| 2014/0268877 A1 | 9/2014 | Yang et al. | |
| 2015/0047765 A1 | 2/2015 | Vo et al. | |
| 2015/0124426 A1 | 5/2015 | Grajear | |
| 2015/0162507 A1* | 6/2015 | McRae | H01L 33/505 257/89 |
| 2015/0275078 A1 | 10/2015 | Vo et al. | |
| 2017/0222095 A1* | 8/2017 | Yamashita | H01L 33/501 |

OTHER PUBLICATIONS

Carroll, Joseph et al.; "Photopigment basis for dichromatic color vision in the horse"; Journal of Vision; 2001; v. 1; pp. 80-87.

Delabbio, Juliette L.; "LED Lighting for Improved Performance and Energy Savings in Poultry Farming"; The Science of Poultry Lighting; Once Innovations Inc.; White Paper; pp. 1-5.

Huber-Eicher, B. et al.; "Effects of colored light-emitting diode illumination on behavior and performance of laying hens"; Poultry Science; 2013; v. 92; pp. 869-873.

Kristensen, Helle H. et al.; "The behaviour of broiler chickens in different light sources and illuminances"; Applied Animal Behavior Science; 2007; v. 103; pp. 75-89.

Marrin, K.; "Properties of LED light can boost poultry production and profits"; LEDs Magazine; Jun. 2014; https://www.ledsmagazine.com/horticultural-lighting/agricultreaquaculture/article/16695282/properties-of-led-light-can-boost-poultryproduction-and-profits-magazine.

Pan, Jinming et al.; "Artificial Polychromatic Light Affects Growth and Physiology in Chicks"; PLoS ONE; 2014; 9(12); e113595; pp. 1-21.

Parvin, R. et al.; "Light emitting diode (LED) as a source of monochromatic light: a novel lighting approach for immunity and meat quality of poultry"; World's Poultry Science Journal; vol. 70; Sep. 2014; pp. 557-562.

Prayitno, D.S. et al.; "The Effects of Color of Lighting on the Behavior and Production of Meat Chickens"; Poultry Science; 1997; v. 76; pp. 452-457.

Prescott, N.B. et al.; "Spectral sensitivity of the domestic fowl (*Gallus g. domesticus*)"; British Poultry Science; 1999; v. 40; pp. 332-339.

* cited by examiner

QUANTUM DOT-BASED LIGHTING DEVICES FOR ANIMAL HUSBANDRY AND AQUARIUMS

CROSS-REFERENCE TO RELATED APPLICATIONS

This application claims the benefit of U.S. Provisional Application No. 62/281,882, filed on Jan. 22, 2016, the contents of which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention generally relates to illumination devices. More particularly, it relates to artificial lighting using quantum dots for spaces housing animals.

2. Description of the Related Art Including Information Disclosed Under 37 CFR 1.97 and 1.98

Artificial lighting is commonly used in the poultry industry, with a number of companies offering lighting solutions, mainly based on light-emitting diodes (LEDs). Studies have shown that poultry production can be greatly improved by the simultaneous management of three conditions:

the color of light;

light intensity; and illumination time (photoperiod).

In the United Kingdom, animal welfare guidelines state that, when rearing broiler chickens, lighting conditions should meet the following standards:

chickens should be provided with a period of darkness of at least 30 minutes per day;

all chicken houses should have uniform levels of light; and light intensity should be at least 20 lux at bird eye height.

The photopic response of poultry differs from that of humans, with poultry having the ability to visualise UV light. In addition, poultry have extra-retinal photoreceptors in the brain. Numerous studies have sought to identify the optimum lighting conditions for rearing poultry.

Domestic fowl are quadchromants, with sensitivity to UV (peak at 385 nm), blue (peak at 450 nm), green (peak at 550 nm) and red (peak at 640 nm) light. Their sensitivity to 450-nm and 640-nm light is 12 and 4 times that of humans, respectively. Using a behavioral test to determine the spectral sensitivity of domestic broiler fowl (*Gallus g. domesticus*), it was found to be highest between 533-577 nm. Two areas of low sensitivity were observed at 415 nm and 600 nm.

In addition to retinal photoreceptors, poultry have extra-retinal photoreceptors in the brain, located in the pineal gland and the hypothalamus. The pineal gland is responsible for controlling a bird's circadian rhythm, while the hypothalamus controls most homeostatic and physiological processes, including reproduction. One study found no significant differences in the effects of different lighting conditions on blind and sighted laying hens, suggesting that light penetrating the skull may influence poultry development.

Lighting for Rearing Broiler Poultry

Broilers are poultry raised for meat production. Studies have shown that the color and/or color temperature of light under which broilers are reared can affect their behavior, body mass and meat quality.

Color of Light

The effects of blue, green, red, and white light on tissue growth and bird behavior in broiler chickens has been investigated. In the study, the birds were able to choose their light environment after 28 days of being in a particular light environment to determine their color preference.

Birds reared in red or white light were more active, displaying greater walking activity in white light and greater floor pecking, wing stretching and aggression in red light. Aggressive behavior was less common in birds reared under green or blue light, and intermediate in birds reared under white light.

After one week of being able to choose their color environment, all birds chose a different color from that of their previous environment. Birds reared in white, red or green light showed a preference for blue light, with green light being their second choice. Birds reared in blue light showed a preference for green light, with blue light being their second choice.

Other studies have investigated the effect of polychromatic light with various green and blue components on the growth and physiology of chicks. Rearing chicks under blue-green light with a depleted blue (30% blue) or a medium blue (50% blue) component resulted in decreased body mass, whereas an enriched blue (70%) component promoted body mass compared to rearing chicks under monochromatic green or blue light. Food intake correlated positively with final body mass.

The effects of monochromatic LED light on meat quality has been reviewed. One study has shown that breast and drumstick muscle from poultry reared under mixed blue-green light has a softer meat structure compared to that of poultry reared under incandescent light. White light has been shown to result in the lowest fat content in breast meat and to improve its amino acid content.

Thus, rearing broilers in blue-enriched blue-green light may potentially offer benefits such as improvements in bird behavior, increased body mass and improved meat quality.

Color Temperature of White Light

A previous study found that when rearing poultry under white light, color temperature influenced bird behavior. Broiler chickens were reared in eight different light environments, comparing four light sources, each at two different illuminances. The light sources tested consisted of:

fluorescent tubes with a correlated color temperature (CCT) of 6500 K;

a spectral sensitivity-matched light source;

incandescent bulbs; and warm white fluorescent tubes.

Light intensities of 5 chicken lux (or "clx"—a measure that takes into account the spectral sensitivity of chickens) and 100 clx were investigated.

At one week of age, the broilers showed no preference for light source, but by six weeks of age, they showed a preference for 6500 K light or warm white light, the two illumination sources closest to daylight. Light source affected feather-directed behavior and object manipulation. Illuminance was found to have little effect on bird behavior.

When reared in their preferred light environment, broilers displayed more feather-directed behavior (preening and pecking), object manipulation and foraging in 6500 K light than in warm white light.

Taken together with the results from the study wherein birds showed a preference for a blue- or green-light environment, overall, the studies suggest that rearing broilers in either blue-green light or cool white light may have a positive influence on animal welfare.

Lighting for Rearing Laying Hens

Lighting color has been found to influence the sexual development and consequent egg-laying performance of hens.

In a study of the effects of colored light on egg-laying performance, laying hens were kept under white, red (640 nm) or green (520 nm) light for four weeks after two weeks under white LED light. Red light resulted in accelerated sexual development and superior laying performance when compared to hens maintained under white or green light, which showed no differences compared to one another.

The influence of light wavelength on reproduction, growth and stress of laying hens has also been investigated. Cages were fitted with LED strips providing pure green (526 nm), pure red (632 nm), or white (red, green and blue) light, set to 10 lux. Red and white light resulted in higher concentrations of the sex hormone oestradiol in hens, indicating stronger ovarian action. This, in turn, resulted in a significantly lower age at first egg production, compared with green light. Hens reared under red or white light also had a longer and higher peak egg production and higher cumulative egg production than hens reared under green light. The study compared blind to sighted birds, finding no significant differences. This suggests that extra-retinal photoreceptors may be stimulated by longer wavelength (red) light that can more easily penetrate the skull than shorter wavelengths of light.

The results of the studies suggest that rearing laying hens in a red light-enriched environment may be beneficial in terms of stimulating egg production.

The results of the studies concerning artificial poultry lighting suggest that white light may not be optimal for poultry welfare and development, and that it may be of benefit to rear broilers under different conditions than that for laying hens. While cooler white or blue-green light has been found to be of preference and benefit to broilers, sexual development and egg-laying performance is enhanced when laying hens are reared under red light. Given the preference of poultry for blue or green light, a lighting system comprising white or blue-green light with an enhanced red component may provide a balance between egg production and animal welfare for rearing laying hens.

Prior art solutions to animal lighting have used monochromatic light sources, either alone or in combination, as well as sources of white light. Using these methods, the wavelength(s) of light cannot easily be tuned during animal development. Studies have shown that different wavelengths of light provide superior results at different stages of animal development. Thus, there is a need in the art for a tuneable light source that can be manipulated to emit different wavelengths of light during different stages of animal development.

Lighting for Aquariums

Other artificial animal environments may benefit from the color selection ability provided by light sources that comprise quantum dots—for example, aquariums.

Aquariums typically employ either LED lights which use multiple LEDs that emit different colors to provide a range of different overall light colors or fluorescent tubes which produce broad-spectrum light but only last for about six to nine months before beginning to fade (which can lead to algae growth—a real problem for aquarium owners). The use of an appropriately tuned quantum-dot-based light source can both promote photosynthesis and also provide the best display colors for the fish. These features, combined with the superior lifetime and low energy consumption of LEDs, provide an attractive alternative to the current use of fluorescent tubes.

BRIEF SUMMARY OF THE INVENTION

A lighting fixture which may be tuned for optimal animal development comprises a backlight, such as an LED, and one or more retractable, rotatable or interchangeable lenses incorporating quantum dots. By selecting the appropriate lens or lenses, the color and/or color temperature emitted by the lighting fixture may be altered during animal development.

BRIEF DESCRIPTION OF THE SEVERAL VIEWS OF THE DRAWING(S)

FIG. 4 shows a flat LED array/QD film lighting system for aquariums and the like.

DETAILED DESCRIPTION OF THE INVENTION

Quantum dots (QDs) are nanoparticles of semiconductor material, typically with diameters <10 nm. Upon excitation by a primary light source, QDs down-convert light, emitting at a longer wavelength. Due to size quantization effects, their emission can be tuned by manipulating the particle size, without changing the inherent semiconductor material. By choosing a material with an appropriate band gap, QDs can be synthesized to emit from the ultraviolet (UV) to the near-infrared (NIR) region of the electromagnetic spectrum. QDs can be synthesized in colloidal solutions, yielding nanoparticles that are surface functionalised ("capped") with organic ligands. These ligands provide solubility, enabling the QDs to be processed, e.g. to form films. Lighting products incorporating QDs excited by primary LED backlights are now commercially available. When combining QDs with a primary light source, such as an LED, the relative intensities of the colors of light emitted can be controlled by adjusting the concentration of QDs.

Herein, a lighting fixture is described comprising a backlight, such as, but not restricted to, an LED, and a series of one or more retractable, rotatable or interchangeable lenses comprising QDs, such that the color and/or color temperature emitted by the lighting fixture can be altered during animal development.

As used herein, the term "lens" may be used to describe a plano-lens or film, and need not focus or otherwise alter the path of light travelling through it.

Figure 1:
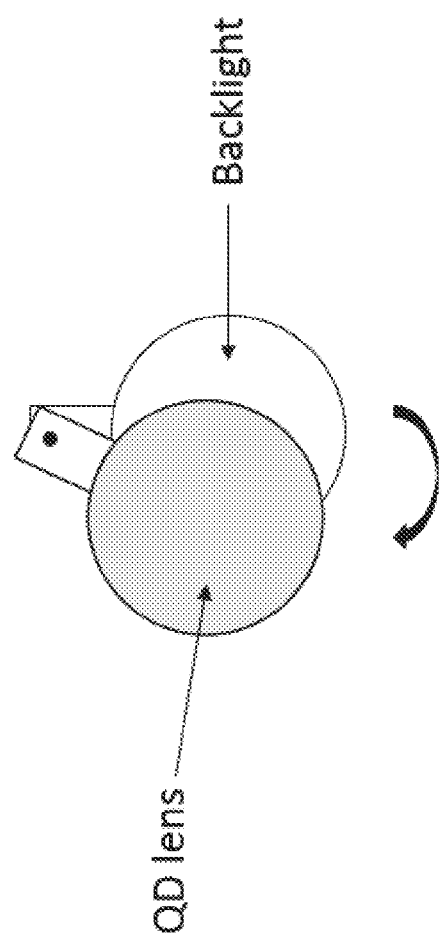
FIG. 1 shows a lighting fixture according to an embodiment that comprises a backlight and a retractable or rotatable quantum dot lens.

FIG. 1 shows a lighting fixture according to one embodiment of the invention, comprising a backlight and a QD lens. One or more QD lenses can be included in the lighting fixture. The one or more lenses are designed to retract or rotate, such that the spectrum of light emitted from the lighting fixture can be controlled and altered.

Figure 2:
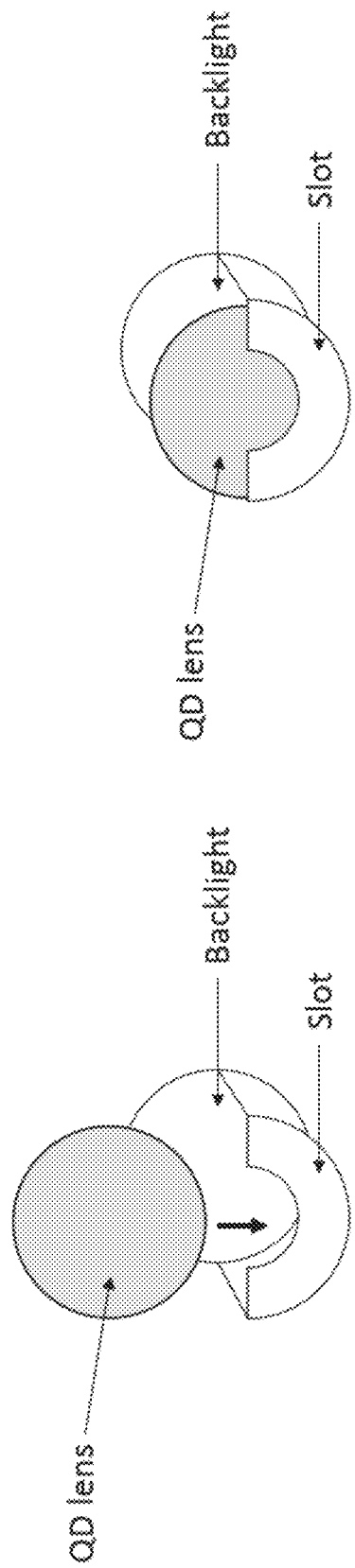
FIG. 2 shows a lighting fixture according to an embodiment that comprises a backlight and a slot into which a quantum dot lens can be inserted.

FIG. 2 shows a lighting fixture according to one embodiment of the invention, comprising a backlight and a QD lens. The lighting fixture comprises one or more slots, into which one or more QD lenses can be inserted, allowing the QD lens(es) to be interchanged and thus enabling the spectrum of light emitted from the lighting fixture to be controlled or altered.

Poultry Lighting

For the rearing of poultry, studies have shown blue/green light to be of benefit, while the sexual development and egg-laying performance of poultry has been shown to be promoted by red light. QD lighting, as described herein, may provide an ideal solution for poultry lighting applications, allowing the spectrum to be tuned to meet the preferences and needs of poultry. For example, blue-green light optimised for rearing broilers can be provided by a combination of blue LEDs and green quantum dots, manipulating the ratio of blue to green light by changing the concentration of QDs. Alternatively, cool white light can be produced using "white LEDs" (a combination of green, red, and blue LEDs or one or more LEDs together with a phosphor) with a blue-green QD film or lens. Similarly, red-enhanced light for rearing laying hens could be produced using a combination of white LEDs and a red QD film or lens, or blue LEDs with green and red QDs.

In one embodiment, a lighting fixture comprises a blue LED backlight, a green QD lens and a red QD lens, wherein the lenses can be rotated, retracted or interchanged. By rotating, retracting or interchanging the QD lenses, the lighting fixture can emit: white light (blue+green+red); blue/green light (blue+green); blue/red light (blue+red); or blue light.

In another embodiment, a lighting fixture comprises a UV LED backlight, a blue QD lens, a green QD lens and a red QD lens, wherein the lenses can be rotated, retracted or interchanged. By rotating, retracting or interchanging the QD lenses, the lighting fixture can emit: UV/white light (UV+blue+green+red); UV/blue/green light (UV+blue+green); UV/blue/red light (UV+blue+red); UV/green/red light (UV+green+red); UV/blue light (UV+blue); UV/green light (UV+green); UV/red light (UV+red); or UV light.

In another embodiment, a lighting fixture comprises a UV and blue LED backlight, a green QD lens and a red QD lens, wherein the lenses can be rotated, retracted or interchanged. By rotating, retracting or interchanging the QD lenses, the lighting fixture can emit: UV/white light (UV+blue+green+red); UV/blue/green light (UV+blue+green); UV/blue/red light (UV+blue+red); or UV/blue light (UV+blue).

In a further embodiment, a lighting fixture comprises a white LED backlight, a blue QD lens, a green QD lens and a red QD lens, wherein the lenses can be rotated, retracted or interchanged. By rotating, retracting or interchanging the QD lenses, the lighting fixture can emit: white light (white, or white+blue+green+red); blue/green-enhanced white light (white+blue+green); blue/red-enhanced white light (white+blue+red); green/red-enhanced white light (white+green+red); blue-enhanced white light (white+blue); green-enhanced white light (white+green); or red-enhanced white light (white+red).

In a further embodiment, a lighting fixture comprises a UV LED backlight, a blue/green QD lens, comprising blue and green QDs, and a red QD lens, wherein the lenses can be rotated, retracted or interchanged. By rotating, retracting or interchanging the QD lenses, the lighting fixture can emit: white light (UV+blue/green+red); UV/blue/green light (UV+blue/green); UV/red light (UV+red); or UV light.

In a further embodiment, a lighting fixture comprises a white LED backlight, a blue/green QD lens, comprising blue and green QDs, and a red QD lens, wherein the lenses can be rotated, retracted or interchanged. By rotating, retracting or interchanging the QD lenses, the lighting fixture can emit: white light (white, or white+blue/green+red); blue/green-enhanced white light (white+blue/green); or red-enhanced white light (white+red).

In particular embodiments, the one or more QD lenses are positioned such that the lens comprising the shortest wavelength emitting QDs is located closest to the primary light source, with subsequent lenses being positioned in increasing order of QD emission wavelength, from shortest to longest, to prevent reabsorption of light emitted by the QDs.

In one embodiment, the lighting fixture emits blue and green light, wherein the intensity of blue to green light is 7:3.

In one embodiment, cool white light is generated by combining blue LEDs with green and red QDs, such that the intensity of the blue and green components is higher than that of the red component.

In one embodiment, a red-enhanced white light is produced by combining blue LEDs with red and green QDs, such that the intensity of the red light is greater than that of the blue and green components. In an alternative embodiment, a cool white light source, such as a cool white LED lamp, is combined with a red lens comprising red QDs. In one particular embodiment, a warm white light with a CCT of 2700 K is produced by combining a cool blue/white LED (CCT 5900 K) with a red QD lens.

In one embodiment, the emission spectrum of the lighting fixture comprises a red spectral component in the region of 630 nm.

QD Lighting with a Correlated Color Temperature Close to that of Sunlight or Moonlight For rearing diurnal animals in an artificial lighting environment, a white light source with a CCT close to daylight (5500-6000 K around midday) may be advantageous. For the rearing of nocturnal animals, a white light source with a CCT in the region of 4100-4150 K can be produced. White light with a range of color temperatures can be produced by combining blue LEDs with red and green QDs in the correct ratio. In alternative embodiments, white light can be produced by combining blue LEDs with a yellow-green rare earth phosphor and red QDs.

In one embodiment, a lighting fixture comprises an LED backlight and a plurality of rotatable, retractable or interchangeable QD lenses such that the CCT can be tuned from ~4100 K to ~6000 K by rotating, retracting or interchanging one or more of the QD lenses. This allows the emission from the lighting fixture to be tuned from daylight to moonlight conditions.

QD Lighting for Rearing Animals with Quadchromatic Vision

Some animals, such as certain species of birds, have quadchromatic vision, with spectral sensitivity in the UV, blue, green and red regions of the electromagnetic spectrum. Quadchromatic light can be produced by combining UV LEDs with: blue LEDs or blue QDs; green QDs or a yellow-green rare earth phosphor; and red QDs or a red phosphor (e.g. $K_2SiF_6:Mn^{4+}$).

QD Lighting for Rearing Animals with Dichromatic Vision

Some animals, such as non-primate mammals, have dichromatic vision, with spectral sensitivity in the blue and green regions of the electromagnetic spectrum. For rearing dichromatic animals in an artificial environment, dichromatic light can be produced using QDs. This may provide a more efficient lighting system than a white light source, where light emitted in the red region of the spectrum is not wasted. Blue/green light can be produced using a combination of blue LEDs and green QDs. Certain studies have shown that the optimum wavelength of spectral sensitivity to green light lies in the region of 537-557 nm, for example, 539 nm for horses.

In one embodiment, a lighting fixture comprises a blue LED backlight and a green QD lens, wherein the green QDs emit in the region of 537-557 nm.

A QD lens may be prepared by depositing a QD resin on a suitable substrate, followed by encapsulation. The preparation of QD resin materials and films therefrom are well-known in the art, for example as disclosed in the following patents and published patent applications, the contents of which are hereby incorporated by reference in their entirety: U.S. Pat. No. 9,082,941 entitled "Semiconductor Nanoparticle-Based Materials for Use in Light Emitting Diodes, Optoelectronic Displays and the Like"; U.S. Patent Application Publication No. 2013/0075692 entitled "Semiconductor Nanoparticle-Based Light Emitting Materials;" U.S. Patent Application Publication No. 2015/0047765 entitled "Quantum Dot Films Utilizing Multi-Phase Resins;" and U.S. Patent Application Publication No. 2015/0275078 entitled "Quantum Dot Compositions." Suitable substrates may include, but are not restricted to, glass, quartz and plastic materials such as acrylic polymers.

Suitable QD materials include those emitting across the visible spectrum, including, but not restricted to, those based on II-VI materials such as CdS, CdSe and CdTe, III-V materials such as InP and GaP, and materials such as $CuInS_2$ and $AgInS_2$, and including core/(multi-)shell, alloyed and doped derivatives thereof. In some embodiments, it is preferable to use QDs free of toxic heavy metals. A particularly suitable example includes InPZnS-based QDs, as disclosed in U.S. Patent Application Publication No. 2014/0264172, the contents of which are herein incorporated by reference in its entirety.

QD Lighting for Aquariums and the Like

Figure 3:
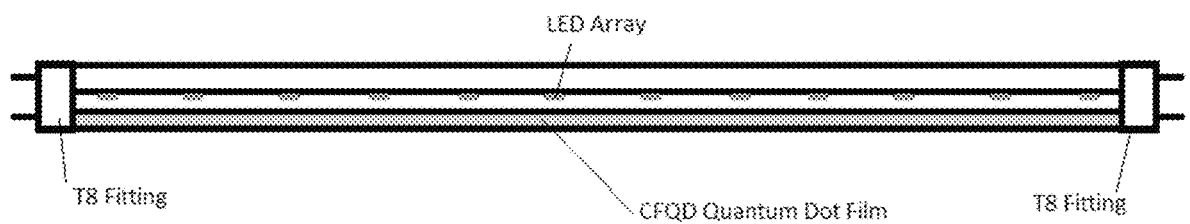
FIG. 3 shows an LED/QD lighting device that may be a direct replacement for a fluorescent tube in a light fixture for e.g. an aquarium.

Referring now to FIG. 3, it can be seen that an embodiment of the invention using the standard T8 style power adapter may be a direct replacement for the fluorescent tubes used in the current lighting system in place in most aquariums. A quantum dot-containing film may be positioned in front of and around an LED array sealed in a watertight tube. The tube may be made in a variety of lengths to allow for direct replacement of the fluorescent tubes in the current aquarium light fixtures on the market. In certain embodiments, the tubes incorporate electronic power supplies that convert the AC power in a conventional fluorescent lighting fixture to the voltages and/or frequencies required by the LEDs. The QD-containing resin film can be optimized to provide varying light intensity at different wavelengths to promote the correct levels of photosynthesis and also the visible qualities of the fish. This may be done by selecting the concentration and/or photoluminescence (PL) wavelengths of the QDs in the film. In certain embodiments, the light emitted by the device will be a selected mixture of the light directly emitted by the LEDs and the light down-converted by the QDs.

Figure 4:
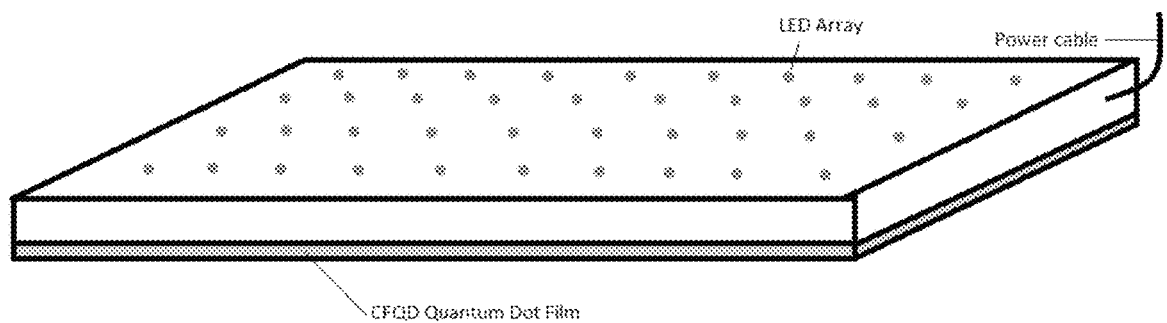

An alternative embodiment, illustrated in FIG. 4, covers the same levels of variations and may be used in new aquariums as a complete replacement for the current lighting systems.

This larger, sealed, watertight array may provide good overall light coverage for new aquariums of various sizes and may be retrofitted after purchase or provided during manufacture.

These embodiments of the invention may provide the ideal wavelengths to promote photosynthesis and plant growth within an aquarium as well as bring out the best colors in the fish, similar to the fluorescent tube systems while having the extended lifetime and low operating costs of LEDs.

Examples

Preparation of a QD Lens

4×1 g of polyisobutylene (PIB) in 10 mL lauryl methacrylate (LMA) (10% PIB/LMA) was prepared and degassed while stirring at 40° C. LMA/bis(2,4,6-trimethylbenzoyl)-phenylphosphinoxide photoinitiator (IRGACURE®. 819) stock solution was prepared using 80 mL LMA and 270 mL IRGACURE 819 [BASF SE COMPANY, CARL-BOSCH-STR. 38, LUDWIGSHAFEN, GERMANY 67056].

Red QD resin was prepared as follows:

In a 100-mL round-bottomed flask, the toluene was removed from a solution of 7.59 mL of red CFQD® heavy metal-free QDs [Nanoco Technologies, Ltd., Manchester, UK] (photoluminescence maximum=611 nm; full-width at half-maximum=56 nm; photoluminescence quantum yield=89%) in toluene. The QDs were heated at 40° C., then cooled. 39.6 mL of LMA/IRGACURE 819 stock solution was added and stirred overnight. 4.81 mL of trimethylolpropane trimethacrylate (TMTPM) was added and stirred. In a 100-mL amber Schott bottle, 4.05 g PIB/LMA was weighed out, then the QD/LMA/IRGACURE. 819/TMPTM mixture was added to the bottle and stirred well, before adding 0.79 g Cab-O-Sil® fumed silica [Cabot Corporation, Alpharetta, Ga., U.S.A.] and stirring to complete the resin.

Blank resin was prepared as follows:

4.81 mL TMTPM was added to the remainder of the LMA/IRGACURE 819 stock solution, in an amber Schott bottle, and left to stir. 4.05 g PIB/LMA was weighed out into a 100-mL amber Schott bottle. The LMA/IRGACURE. 819/TMPTM was added to the PIB/LMA and stirred, before adding 0.79 g Cab-O-Sil fumed silica and stirring to complete the resin.

The QD lens was prepared as follows:

A glass pane was adhered to an aluminum ring using OPTOCAST resin [Electronic Materials, Inc., Breckenridge, Colo., U.S.A.], then cured for 30 seconds in a UV oven. 370 μL red QD resin and 430 μL blank resin were mixed, then deposited onto the glass pane using a syringe. The resin was cured in a glove box under a mercury lamp for 3 minutes. The edge of the aluminum ring was coated in OPTOCAST resin, then a plain glass pane was lowered onto it and cured for 30 seconds, under a mercury lamp, in a glove box.

The foregoing presents particular embodiments of a system embodying the principles of the invention. Those skilled in the art will be able to devise alternatives and variations which, even if not explicitly disclosed herein, embody those principles and are thus within the scope of the invention. Although particular embodiments of the present invention have been shown and described, they are not intended to limit what this patent covers. One skilled in the art will understand that various changes and modifications may be made without departing from the scope of the present invention as literally and equivalently covered by the following claims.

What is claimed is:

1. A lighting fixture for illuminating a space having animals therein comprising:
   a backlight;
   a first lens comprising red light-emitting quantum dots; and
   a second lens comprising green light-emitting quantum dots,
   wherein each of the first and second lenses is movable relative to the backlight for entry into and withdrawal from optical communication with the backlight, and
   wherein the first and second lenses are optically communicable with the backlight at the same time.

2. The lighting fixture recited in claim 1 wherein entry of the lenses into and withdrawal of the lenses from optical communication with the backlight comprises rotation of a fixture holding the lenses.

3. The lighting fixture recited in claim 1 wherein entry of the lenses into and withdrawal of the lenses from optical communication with the backlight comprises inserting the lenses into or retracting the lenses from a lens holder attached to the backlight.

4. The lighting fixture recited in claim 1 wherein entry of the lenses into and withdrawal of the lenses from optical communication with the backlight comprises interchanging at least one of the lenses with another lens.

5. The lighting fixture recited in claim 1 wherein the backlight comprises one or more light-emitting diodes (LEDs).

6. The lighting fixture recited in claim 5 wherein the LEDs are blue-emitting LEDs.

7. The lighting fixture recited in claim 5 wherein the LEDs are UV-emitting LEDs.

8. The lighting fixture recited in claim 5 wherein the LEDs are white-light-emitting LEDs.

9. The lighting fixture recited in claim 1 wherein at least one of the lenses further comprise at least one phosphor.

10. The lighting fixture recited in claim 1 wherein the backlight comprises at least one phosphor.

11. The lighting fixture recited in claim 1 wherein the red-emitting and green-emitting quantum dots are selected such that the light from the lighting fixture has a greater intensity of red light than that of either blue light or green light.

12. The lighting fixture recited in claim 1 wherein the backlight and the lenses are oriented relative to each other such that the light from the fixture is white light having an enhanced red light component as compared to sunlight.

13. The lighting fixture recited in claim 1 wherein the backlight and the lenses are oriented relative to each other such that the light from the fixture is blue-green light having an enhanced red light component as compared to sunlight.

14. A method of raising animals comprising:
    illuminating a space having animals therein using a lighting fixture according to claim 1.

15. The method recited in claim 14 wherein the animals are poultry.

16. The lighting fixture recited in claim 1, further comprising a third lens comprising blue light-emitting quantum dots, wherein
    each of the first, second and third lenses is movable relative to the backlight for entry into and withdrawal from optical communication with the backlight, and
    the first, second and third lenses are optically communicable with the backlight at the same time.

17. The lighting fixture recited in claim 16, wherein the first, second and third lenses are in optical communication with the backlight at the same time.

18. The lighting fixture recited in claim 16, wherein the first, second and third lenses are positioned relative to the backlight in order of increasing quantum dot wavelength emission.

19. The lighting fixture recited in claim 1, wherein the first and second lenses are positioned relative to the backlight in order of increasing quantum dot wavelength emission.

* * * * *